Patented Mar. 25, 1952

2,590,668

UNITED STATES PATENT OFFICE 2,590,668

CASTOR OIL-UNSATURATED DICARBOX-YLIC ACID COPOLYMER RESINS

Frederick A. Yeoman, Turtle Creek, Pa., assignor to Westinghouse Electric Corporation, East Pittsburgh, Pa., a corporation of Pennsylvania No Drawing. Application May 13, 1947, Serial No. 747,850

5 Claims. (Cl. 260—22)

This invention relates to synthetic resin compositions, and in particular to solvent reactive resinous compositions characterized by substantially no attack upon or reaction with copper.

It has been proposed heretofore to prepare solvent reactive resinous compositions by dissolving an unsaturated acidic ester in a liquid vinyl or vinylidine monomer. The solution so produced may be reacted to produce a copolymer of the ester with the monomer. However, when applied to bare copper or high copper alloy surfaces, the resinous solution reacts with or attacks the copper producing a green discoloration. The green discoloration, while objectionable per se, indicates the formation of copper organic compounds which are powerful inhibitors of polymerization. Consequently, the resinous composition adjacent the copper surfaces fails to cure to a solid state. This condition is undesirable because of the poor fill as well as possibility of escape of the composition because of its fluidity. Furthermore, the physical properties of the structures involving the resin composition treated copper members are unsatisfactory.

Investigation indicates that the following three factors are prominent in the formation of the undesirable copper organic compounds and the accompanying green discoloration. First, the relatively high acidity of the resinous composition is a definite contributor to this undesirable phenomenon.

Second, the presence of oxygen or an oxidizing substance is involved. Green copper organic compounds are formed to the smallest extent when the minimum of atmospheric oxygen is present in the composition or in the members. Thus, treatment of bare copper with a resinous composition of mild corrosive activity will produce only a thin zone of discoloration, whereas treatment of the same copper covered with a fabric results in much more serious discoloration due to the abundance of oxygen present on the fibers of the fabric. While vacuum treatment of the fabric-covered copper prior to introduction of the resin reduces the green discoloration somewhat, the oxygen appears to be absorbed so firmly in the fabric that its removal is not practical. Furthermore, certain catalysts employed for curing of the resinous composition have a more pronounced oxidizing effect than other catalysts and green discoloration is much more evident when the former are used as compared to resins produced by incorporating less powerful oxidizing catalysts.

The third factor involved appears to be the vinyl-type functionality of the resinous composition, because a vinyl or vinylidine group must be present before discoloration is encountered. It is possible that peroxides formed by reaction of atmospheric oxygen or oxidizing catalysts with vinyl or vinylidine groups are the corrosive agents which make the initial attack upon copper. Furthermore, the rate of gelation and curing affects the amount of undesirable copper organic compound produced. Therefore, compositions characterized by a high vinyl functionality, all other factors being equal, are preferable because they polymerize more rapidly so that reaction or attack on the copper is minimized or even eliminated.

The object of this invention is to provide a completely reactive resinous solution which will cure to a solid in contact with copper without any pronounced attack on the copper.

A further object of this invention is to provide completely reactive solutions of a monomer having a $H_2C=C<$ group and certain complex esters of castor oil-unsaturated dicarboxylic acid characterized by a low degree of reaction with copper.

Other objects of the invention will in part appear hereinafter and will in part be obvious.

According to this invention, a completely reactive resinous composition having a relatively low acidity and a high degree of vinyl type functionality is prepared by dissolving in a liquid monomer having the group $H_2C=C<$ a complex ester prepared by reacting a dihydric alcohol or an alkylene oxide with the acidic half ester of castor oil and an unsaturated dicarboxylic acid. The solution so prepared may be polymerized into a thermoset copolymer even against copper with little or no discoloration and having no liquid or unpolymerized products present in contact with the copper surfaces.

More specifically, the acid half ester of castor oil is prepared by reacting castor oil with sufficient of an unsaturated alpha, beta dicarboxylic acid to react with an average of at least two of the three hydroxyl groups present in each molecule of castor oil. For most purposes, the full acid half ester of castor oil is preferred. When maleic anhydride is reacted with castor oil in the proportion of two moles of maleic anhydride per mole of castor oil, the average product is the castor oil dimaleate half ester. However, there may be present some full or trimaleate ester of castor oil as well as castor oil monomaleate. The following formulae are those of the castor oil dimaleate and castor oil trimaleate:

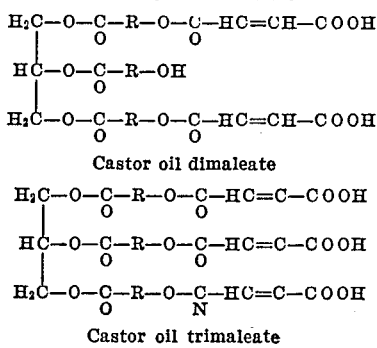

Castor oil dimaleate

Castor oil trimaleate

R denotes the ricinoleic hydrocarbons.

Examples of suitable unsaturated alpha, beta dicarboxylic acids and their anhydrides, both of which are suitable for ester reaction with castor oil, are maleic acid, maleic anhydride, fumaric acid, citraconic anhydride, and monochlor maleic anhydride. This list is only exemplary and not exhaustive. The anhydrides have been found to be particularly suitable for reaction with castor oil, because of the relative ease of esterification of the anhydride at the hydroxyl groups of the castor oil. The esterification of the anhydride is essentially an addition reaction. Since no water need be split off or undesirable products need be eliminated from the reaction, its progress may be readily followed and easily controlled. Also lower reaction temperatures may be used with the anhydrides. Furthermore, the acid half ester produced at each hydroxyl group will contain a carboxyl group which is much more difficult to react to form esters than the anhydride and, therefore, further reaction of the carboxyl groups in the half ester with other hydroxyl groups will ordinarily not take place. While the examples given hereinafter will be specific to the ester of maleic anhydride, it will be understood that other anhydrides and acids may be employed.

The following example indicates the preparation of the full acid half ester of castor oil.

Example I 100 parts by weight of castor oil are admixed with 30 parts of maleic anhydride in a closed reaction vessel and the reactants are heated to a temperature of 120° C. for 4 hours. The acid number will be from 130 to 135, indicating the full acid half ester, or castor oil trimaleate, has been produced. Following the course of the reaction by acid number is the best method of determining its completion. Temperatures as low as 70° C. may be employed though the reaction time will be prolonged considerably. Reaction should not be conducted at temperatures above 160° C. for any appreciable length of time, lest the relatively undesired full ester of the dicarboxylic acid results. Likewise excessive reaction times should be avoided. While catalysts, such as chlorosulphonic acid, may be employed they are not necessary. The product is of a light syrupy consistency.

It has been found that reduction of the acidity of the castor oil-maleate half ester may be accomplished by reaction with a monohydric alcohol but the product is unsuitable for the preparation of the required ultimate solid copolymers by reaction with a monomer having a $H_2C=C<$ group. For example, the reactivity of the relatively neutral methyl ester of castor oil maleate with a vinyl type monomer is so low that for all practical purposes copolymers cannot be prepared therefrom successfully.

It has been found, however, that reacting a sufficient amount of a dihydric alcohol or an alkylene oxide with a castor oil malate acid half ester having an average of two or more carboxyl groups per molecule to provide a hydroxyl group for each carboxyl group or an oxide group for each two carboxyl groups will produce complex esters that have low acidity a high vinyl type functionality and react most satisfactorily with monomers having a $H_2C=C<$ group. Examples of suitable dihydric alcohols are ethylene glycol, propoylene glycol, trimethylene glycol, 2-ethylhexanediol-1,3-diethylene glycol, 1,3-butandiol, 1,4-dihydroxybutene 2, and bis-hydroxypropyl maleate. Suitable alkylene oxides are ethylene oxide, propylene oxide and butadiene monoxide. Mixtures of dihydric alcohols or alkylene oxides may be employed. Examples of the preparation of the complex esters follow:

Example II

In a closed reaction vessel provided with a mechanical stirrer, a thermometer and sparging means is placed 300 parts by weight of the castor oil trimaleate produced as in Example I, 0.114 part of quinhydrone, and 22.9 parts by weight of ethylene glycol. This is a ratio of 1.5 moles of ethylene glycol to one mole of the castor oil trimaleate. The reaction mixture is slowly heated with stirring until a temperature of 150° C. is reached. Then carbon dioxide gas is passed into the reaction vessel to sparge it. Heating is continued until the temperature reaches from 180° to 190° C. and maintained in that temperature range for approximately 4 hours. Gelling of the reactants is to be avoided, therefore the mixture is cooled quickly to room temperature when a relatively rapid viscosity rise occurs. A typical acid number obtained for the reaction product is 18.2. It is a viscous, light yellow oil.

One part by weight of the complex ester of Example II is dissolved in one part by weight of monostyrene and 0.5% by weight, based on the total weight, of tert-butyl perbenzoate is added as a catalyst. A sample of the solution is placed in a cup and a copper strip introduced so that a portion of the strip is exposed to the atmosphere and a portion is immersed in the solution. The cup with the sample so arranged is placed in the oven and baked for 2 hours at 135° C. At the end of this time the resin will be found to be firmly set up against the copper with no significant discoloration of the copper or the resinous copolymer throughout the body of the sample, except for a very weak green tinge at the surface of the resin at the point where the copper strip passes into the body of the resin. The resin will be completely thermoset with no soft or liquid spots present.

By contrast, the acid half ester of castor oil maleate of Example I when admixed with an equal weight of monostyrene and catalyzed with the same amount of tert-butyl perbenzoate, and allowed to polymerize in contact with copper has a strong green discoloration in the body of resin about the copper. The resin will be quite soft and fluid for a distance of about $\frac{1}{16}$ of an inch from the copper strip.

Example III

A reaction vessel is charged with 150 parts by weight of maleic acid and 200 parts by weight of propylene oxide are added dropwise with stirring while the contents of the vessel are maintained at a temperature of from 95° C. to 105° C. The addition is carried out over a period of 3 hours until all the propylene oxide is introduced and then heating is continued under reflux for two more hours. The acid number of the reaction product is about 104. 50 additional parts of propylene oxide is added to the reaction mixture and stirred while the temperature is slowly raised over a 2 hour period of 105° C. After the reaction product is refluxed for 4 hours, it is found to have an acid number of 45.7. The resulting compound is bis-hydroxypropyl maleate. It is a mobile light yellow oil.

Into a closed reaction vessel there is placed 300 parts by weight of castor oil trimaleate from Example I, 0.114 part by weight quinhydrone and 85.7 parts by weight of the bis-hydroxypropyl maleate prepared as above. This is a ratio of 1.5 moles of bis-hydroxypropyl maleate to one mole of castor oil trimaleate. The reaction mixture is heated with stirring to a temperature of 190 to 200° C. when sparging with carbon dioxide is initiated. After reacting for 3 hours and 30 minutes, the reaction product becomes quite viscous and is rapidly cooled to prevent further reaction. The product is a viscous oil of a light yellow color. It can be poured only with difficulty but gelation had not taken place.

Equal parts by weight of monostyrene and the viscous complex castor oil maleate ester of this example are admixed and catalyzed with 0.5% by weight of tert-butyl perbenzoate. Bodies of the resin are poured in cups and strips of copper are disposed partly in the solution and partly exposed to the atmosphere. Upon heating in an oven for a few minutes at 135° C. gelation occurs. The temperature is reduced by removing the cups from the oven in order to avoid excessive reaction. After 15 minutes, the sample is returned to the oven and baked 2 hours at 135° C. There will be no observable discoloration in any portion of the resin nor will there be any uncured resin. The entire body will be of a similar hardness.

Other unsaturated dihydric alcohols may be employed to form complex esters. They will enable the preparation of complex esters having a high vinyl functionality. This assures rapid curing against copper surfaces without any green copper organic compound being produced.

To lessen the danger of gelation during preparation, it may be desirable to reduce the functionality of the complex esters of Examples II and III. This may be accomplished by reacting a monohydric alcohol with the acid castor oil maleate ester in such an amount as to terminate about one carboxyl group per molecule. The monohydric alcohol prevents the possibility of cross coupling of the castor oil maleate through at least that carboxyl group thus terminated when a dihydric alcohol is thereafter reacted with it. From an average of 0.5 of a carboxyl group per molecule to as much as 1.5 carboxyl groups per molecule may be thus terminated. The following examples illustrate this feature of the invention.

*Example IV*

Into a closed reaction vessel there is placed 300 parts by weight of castor oil trimaleate, 0.114 part by weight of quinhydrone and 18.2 parts of n-butanol, the castor oil trimaleate and n-butanol being in equimolar proportions. The mixture is stirred and heated at reflux temperature for a period of 7 hours. The change in acidity indicates the esterification of an average of one carboxyl group of the castor oil trimaleate with n-butanol. The reflux condenser is replaced with a gas bubbler and 15.3 parts by weight of ethylene glycol are added. The reactants are heated to 180 to 190° C. with stirring and sparging with carbon dioxide through the gas bubbler. After 6 hours' reaction in this temperature range, the reaction vessel is cooled. The complex ester produced has an acid number of 30.3 and is much less viscous than the reaction product of Example II.

A sample of the complex ester of this example is dissolved in an equal weight of monostyrene and catalyzed with 0.5% by weight of tert-butyl perbenzoate. A strip of copper is so placed that it is partly disposed in the resin solution and partly exposed to the atmosphere. Upon heating the sample for 2 hours at 135° C. the resinous copolymer will be firmly set up throughout the body of the resin, and a barely noticeable green discoloration may be present adjacent the copper surface and a weak green coloration may be present at the air-resin interface adjacent the copper strip. However, none of the resin will be soft or indicative of inadequate curing.

*Example V*

Into a closed reaction vessel there is introduced 300 parts by weight of castor oil trimaleate and 0.114 part by weight of quinhydrone. Through a funnel there is introduced 14.5 parts of propylene oxide over a period of time of 30 minutes while the reaction vessel contents are vigorously stirred. Upon completion of the addition of the propylene oxide, the reaction mixture is warmed gradually over a 2 hour period to 105° C. The mixture is then stirred with refluxing for a period of 4 hours and then cooled. The cooled complex ester product has an acid number of 94. This indicates that approximately ⅓ of the free carboxyl groups of the castor oil maleate have been esterified with propylene oxide.

Thereafter 57.1 parts by weight of bis-hydroxylpropyl maleate is added to the complex ester and the reactants are again heated until a temperature of from 190 to 200° C. is reached. Stirring and sparging with carbon dioxide is begun while the reactants are maintained at this temperature for 4 hours. Upon cooling to room temperature, the resulting complex ester is found to have an acid number of 43. It is a rather viscous oil of amber color.

The low acid number complex ester produced in this two-stage reaction is admixed with an equal part by weight of monostyrene and 0.5% by weight of tert-butyl perbenzoate. A sample of the resultant solution is placed in an aluminum cup and a strip of copper disposed partly in the solution and partly exposed to the atmosphere. Upon baking for 2 hours at 135° C. the resin will be found to be firmly set up against the copper. There will be no evidence of green coloration throughout the body of the resin except for a faint surface band immediately adjacent the copper where it enters the body of the resin.

For use in dissolving and reacting with the complex esters as described herein, there may be employed, besides monostyrene, polymerizable liquid monomers having the group $H_2C=C<$, examples of which are distyrene, vinyl acetate, paramethyl styrene, methyl vinyl ketone, acrylonitrile, methyl methacrylate, ethyl acrylate and allyl esters, such as diallyl phthalate. These monomers may be employed in the proportions of 100 parts of the monomer to from 5 to 300 parts by weight of the complex ester. If the proportions of 100 parts of the monomer and from 5 to 25 parts of the complex ester of castor oil maleate are used, the resulting resinous copolymer will be relatively hard. As greater proportions of the complex castor oil maleate half esters are employed, the resulting copolymers will be more flexible or elastic.

Suitable catalysts for copolymerizing the solution of monomer and complex ester are peroxides suitable for vinyl type polymerization, such as ascaridole, lauroyl peroxide and tert-butyl perbenzoate. The catalyzed solution may be heated in a range of temperature of from 50° C. to 250° C. At the lower temperatures, the reaction may be quite prolonged but in some cases the quality of the product is improved by the slower reaction. For general use, particularly in contact with copper, a more rapid reaction is preferable, since this reduces the time of contact of copper with unsaturated groups and avoids the formation of the undesirable green copper organic compounds. Therefore, temperatures of from 100 to 150° C. will be found advantageous. In some cases, the reaction may be carried out by the use of ultraviolet light in combination with a catalyst, with or without heating.

The resinous compositions of this invention will cure uniformly to hard solid bodies against bare copper regardless of the type of catalyst employed therewith. Thus tert-butyl perbenzoate is a catalyst having a relatively mild oxidizing action and compositions cured by its use will set up to a uniform degree against bare copper, and green discoloration will be practically absent. When a more powerful oxidizing material, such as benzoyl peroxide, is used as a catalyst for the compositions applied to bare copper, they may show a green tinge at the copper interface and at the point where the copper projects into the atmosphere, but in all cases the resins will be found to be uniformly solidified in the same time.

While the compositions of this invention have considerable advantages when applied to copper and copper alloy surfaces, they are extremely well suited for numerous other applications. Thus not only can electrical coils and windings be treated with the compositions of this invention to provide solid insulating and impregnating treatment therefor, but the compositions can be applied to enameled wire, magnetic cores and other electrical structures in which bare copper surfaces are not present. The compositions disclosed herein are not only suitable for coating electrical members but also for encapsulating or potting entire electrical or structures into a rigid solid body. Furthermore, the compositions may be cast into members of any desired shape or size. These bodies will be characterized by homogeneity and freedom from pores and cavities, since the resinous solutions are completely reactive. No gases or by-products requiring removal are produced during the reaction.

The resinous compositions disclosed herein may be combined with various fibrous and powdered solids, such as asbestos fibers, glass fibers, mica powder, silica, wood flour, cotton cloth, asbestos paper, and pigments and dyes. Laminates may be prepared by dipping cloth in the resinous solutions and wrapping the cloth about mandrels or forms or placing sheets of cloth in a mold cavity and upon lightly compressing the resin impregnated sheets and heating them, solid members reinforced with the cloth may be readily obtained without the use of high pressures.

The resinous products with or without reinforcing materials may be readily machined, and shaped as by sawing, drilling, sanding, or otherwise finished to meet any requirements.

Since certain changes in carrying out the above process and certain modifications in the article which embody the invention may be made without departing from its scope, it is intended that all matter contained in the above description shall be interpreted as illustrative and not in a limiting sense.

I claim as my invention:

1. A composition comprising a solvent composed of 100 parts by weight of a polymerizable liquid monomer having a $H_2C=C<$ group and a solute comprising from 5 to 300 parts by weight of the ungelled, low acid number complex ester reaction product of (A) an acidic castor oil-alpha beta unsaturated dicarboxylic acid half ester having an average of at least two free carboxyl groups per half ester molecule, (the acid half ester having been prepared by reacting one mole of castor oil with between two and three moles of an unsaturated alpha, beta acidic compound selected from the group consisting of fumaric acid, maleic acid, maleic anhydride, monochlormaleic anhydride and citraconic anhydride, and (B) one equivalent based on the carboxyl groups of the half ester of at least one compound of the group consisting of alkylene oxides and glycols, the last-mentioned compound having no other reactive group than the oxide group or the alcohol groups, respectively, and an ethylenic group.

2. The solid resinous copolymer of 100 parts by weight of a polymerizable liquid monomer having a $H_2C=C<$ group and from 5 to 300 parts by weight of the ungelled, low acid number complex ester reaction product of (A) an acidic castor oil-alpha beta unsaturated dicarboxylic acid half ester having an average of more than two free carboxyl groups per half ester molecule, the acid half ester having been prepared by reacting one mole of castor oil with between two and three moles of an unsaturated alpha, beta acidic compound selected from the group consisting of fumaric acid, maleic acid, maleic anhydride, monochlormaleic anhydride and citraconic anhydride, and (B) one equivalent based on the carboxyl groups of the half ester of at least one compound of the group consisting of alkylene oxides and glycols, the last-mentioned compound having no other reactive groups than the oxide group or the alcohol groups, respectively, and an ethylenic group.

3. The solid resinous copolymer of 100 parts by weight of monostyrene and from 5 to 300 parts by weight of the ungelled, low acid number complex ester derived by reacting sufficient of bis-hydroxypropyl maleate with an acidic castor oil-maleate half ester having an average of at least two carboxyl groups per molecule of the half ester to provide a hydroxyl group for each carboxyl group in the castor oil maleate.

4. The solid resinous copolymer of 100 parts by weight of monostyrene and from 5 to 300 parts by weight of the ungelled, low-acid number complex ester derived by reacting sufficient hydrocarbon glycol with an acidic castor oil-maleate half ester having an average of at least two carboxyl groups per molecule of the half ester to provide a hydroxyl group for each carboxyl group in the castor oil maleate.

5. The solid resinous copolymer of 100 parts by weight of monostyrene and from 5 to 300 parts by weight of the ungelled, low acid number complex ester derived by reacting sufficient hydrocarbon alkylene oxide with an acidic castor oil-maleate half ester having an average of at least two carboxyl groups per molecule of the half ester to provide a hydroxyl group for each carboxyl group in the castor oil maleate.

FREDERICK A. YEOMAN.

REFERENCES CITED

The following references are of record in the file of this patent:

UNITED STATES PATENTS

| Number | Name | Date |
| --- | --- | --- |
| 2,255,313 | Ellis | Sept. 9, 1941 |
| 2,280,242 | Kropa et al. | Apr. 21, 1942 |
| 2,343,434 | Wells et al. | Mar. 7, 1944 |
| 2,387,395 | Hedges et al. | Oct. 23, 1945 |
| 2,439,953 | Swiss et al. | Apr. 20, 1948 |
| 2,484,215 | Foster | Oct. 11, 1949 |